United States Patent [19]

Miette

[11] Patent Number: 5,103,489
[45] Date of Patent: Apr. 7, 1992

[54] LABEL, METHOD AND DEVICE FOR LOCATING ADDRESSES ON ARTICLES TO BE SORTED

[75] Inventor: Emmanuel Miette, Paris, France

[73] Assignee: Compagnie Generale D'Automatisme CGA-HBS, Paris, France

[21] Appl. No.: 648,754

[22] Filed: Jan. 31, 1991

[30] Foreign Application Priority Data

Feb. 2, 1990 [FR] France .................................. 90 01238

[51] Int. Cl.$^5$ ............................................. G06K 9/20
[52] U.S. Cl. ......................................... 382/48; 382/1; 382/9
[58] Field of Search ...................... 382/1, 9, 8, 48, 16, 382/61; 209/3.3, 3.1-3.2, 538, 584; 235/470, 462, 463, 494; 250/566, 568

[56] References Cited

U.S. PATENT DOCUMENTS

| | | | |
|---|---|---|---|
| 4,124,797 | 11/1978 | Himmel | 235/467 |
| 4,163,212 | 7/1979 | Buerger et al. | 340/146.3 H |
| 4,776,464 | 10/1988 | Miller et al. | 209/3.3 |

*Primary Examiner*—Michael Razavi
*Attorney, Agent, or Firm*—Sughrue, Mion, Zinn Macpeak & Seas

[57] ABSTRACT

In a method of locating addresses on articles to be sorted, such as mail items of many different kinds, a specific addressing mark is associated with the address on an addressing label or other addressing support. The mark comprises a ring and an asymmetric logotype.

14 Claims, 3 Drawing Sheets

LABEL, METHOD AND DEVICE FOR LOCATING ADDRESSES ON ARTICLES TO BE SORTED

BACKGROUND OF THE INVENTION

1. Field of the invention

The present invention concerns locating addresses on articles to be despatched so that the addresses can be read automatically so that the articles can be sorted automatically. It applies to articles of all kinds and in particular a wide range of mail items, especially magazines, large envelopes, packets and the like.

2. Description of the prior art

The increasingly automated sorting of mail items is made possible by the use of image processing and character recognition techniques. These techniques process a digitized image of the articles to be sorted. Whatever character recognition method is used, one of the preliminary functions to be implemented before reading the mailing address is to locate the address within all of the information constituting the digitized image of each article.

Known methods of locating addresses on articles are essentially of two types.

One type uses the optical properties of certain mail items. The methods in most widespread use are based on the difference in optical reflection due to the presence of an address window in an envelope. Other methods of this kind detect the excess thickness due to an address label stuck onto the article or the edges of an addressing window on the article. The additional thickness is detected by means of coherent light.

The second type methods operate directly on the digitized images of the articles to be sorted. They are based on recognizing the shape of each article and use characteristics defining the position of the addressing area on each article.

Locating the addressing area by a method of either of these two types enables its content to be scanned and thus enables the automatic reading of addresses for automatic sorting of articles. The methods of the first type give good results but they are generally adopted only for mail items comprising window envelopes. The second type methods cover a wider range of mail items, but sometimes yield incorrect results. They lead to errors if the addresses do not comply with position specifications as defined, for example, by mailing standards. This is the case in particular if the address labels are applied by hand and positioned incorrectly or in the case of address labels which, although initially stuck on in the correct position, have come unstuck and have moved on the surface of the article, inside a plastics wrap containing them. Under such conditions the known methods cannot distinguish the address, to enable it to be scanned, from any advertising or other information on the wrap and/or the article and reproduced in the digitized image of the article.

An object of the present invention is to avoid the drawbacks of these known methods by enabling the address to be located within the digitized image of a broad spectrum of articles, virtually free of errors and irrespective of the position and the orientation of the address on the article and therefore in the image, for subsequent automatic processing of such articles.

SUMMARY OF THE INVENTION

In one aspect, the invention consists in a method of locating addresses on articles to be sorted in order to enable scanning of said addresses, said method comprising:

associating with each address an addressing mark different from all other information likely to be carried by said articles, said mark comprising a first part whose shape is invariant on rotation and a second part having an irregular shape;

producing a digitized image of each article;

determining within said image two cartesian coordinates of a point on said first part of said mark in order to deduce therefrom two cartesian coordinates of a point of the address to be scanned, by comparing at least part of said digitized image to a first predetermined data set characteristic of said first part of said mark;

determining the orientation of said second part of said mark in said image, in order to deduce therefrom the orientation of said address to be scanned, by comparing at least one part of said digitized image with a second predetermined data set characteristic of said second part of said mark oriented in a plurality of different directions.

In another aspect, the present invention consists in an address label adapted to carry an address and, associated with said address, an addressing mark comprising a first part whose shape is invariant on rotation and a second part whose shape is irregular, so that an address on said label on articles to be sorted can be located by a method comprising:

producing a digitized image of each article;

determining within said image two cartesian coordinates of a point on said first part of said mark in order to deduce therefrom two cartesian coordinates of a point of the address to be scanned, by comparing at least part of said digitized image to a first predetermined data set characteristic of said first part of said mark;

determining the orientation of said second part of said mark in said image, in order to deduce therefrom the orientation of said address to be scanned, by comparing at least one part of said digitized image with a second predetermined data set characteristic of said second part of said mark oriented in a plurality of different directions.

In a third aspect, the present invention consists in a device for locating addresses on articles to be sorted in order to enable scanning of said addresses, by a method comprising:

associating with each address an addressing mark different from all other information likely to be carried by said articles, said mark comprising a first part whose shape is invariant on rotation and a second part having an irregular shape;

producing a digitized image of each article;

determining within said image two cartesian coordinates of a point on said first part of said mark in order to deduce therefrom two cartesian coordinates of a point of the address to be scanned, by comparing at least part of said digitized image to a first predetermined data set characteristic of said part of said mark;

determining the orientation of said second part of said mark in said image, in order to deduce therefrom the orientation of said address to be scanned, by comparing at least one part of said digitized image with a second predetermined data set characteristic of said second part of said mark oriented in a plurality of different directions, said addressing mark combining a ring having specific inside and outside diameters and an irregular shape insignia associated with said ring, and said device comprising:

means for detecting pairs of opposite segments of said ring in said digitized image of each article from said first data set defining said characteristics of said ring, means for processing pairs of detected opposite segments to determine a ring center, means for extracting the image from the interior of said ring corresponding to each identified center in said digitized image of said article, and means for comparing said image extracted from said interior of said ring with a limited number of reference images representing said second data set, confirming or validating said center and said ring and defining the orientation of said addressing mark and therefore the position of said address when a single coincidence is detected by said comparison for all of said image of said article.

The characteristics and advantages of the present invention will emerge clearly from the following description of examples of addressing and address location given with reference to the appended diagrammatic drawings.

DETAILED DESCRIPTION OF THE INVENTION

Figure 1:
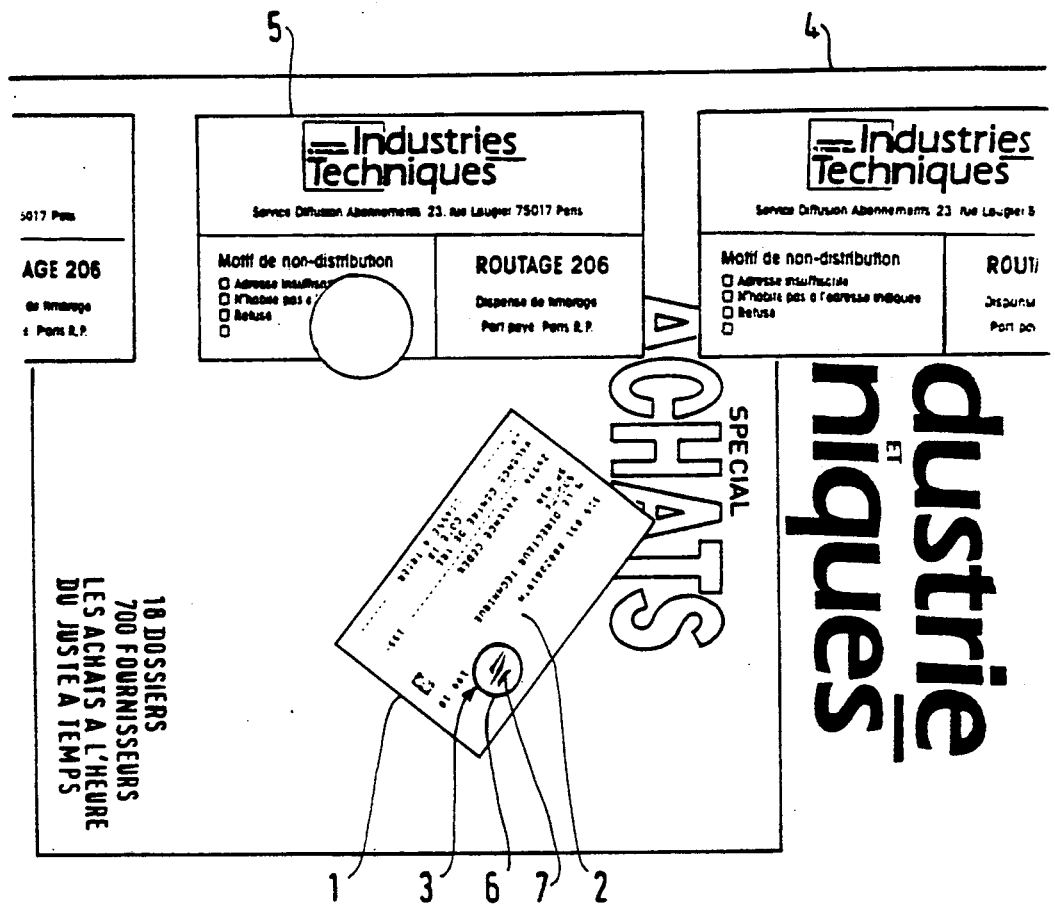
FIG. 1 shows a magazine carrying an address label in accordance with the present invention.

FIG. 1 shows one article from a broad spectrum of articles which are sorted automatically after scanning or reading an address carried by each article and which is included in a digitized image of the article. This article is a magazine. It carries an address label 1 on which is printed the address 2 to be scanned and an addressing mark 3.

The batch of articles of which this magazine forms part may contain a wide variety of articles including other magazines, newspapers, packets and large envelopes. Some of these articles have an address label like the label 1 stuck onto the article and possibly covered with a plastics wrap protecting the article, as in the example shown. Other articles carry an address strip; some large envelopes may have an address window through which the address can be seen. For all these articles the addressing mark 3 is associated directly with the address.

In this example the label 1 is deliberately shown haphazardly positioned on the magazine to which it is attached within a protective plastics wrap 4, this wrap carrying various advertising information or information relating to the mode of despatch, at peripheral locations 5; through the wrap can be seen the address label 1 and various typographical and graphical elements on the magazine. The label 1 might have been initially stuck on in the right place, for example, in accordance with mailing standards, but has subsequently come unstuck and slid around on the magazine, under the plastics wrap.

The addressing mark 3 is chosen to enable location of the address in the digitized image of the article as in that of all the other articles in the batch. To this end the addressing mark 3 is inherently different from virtually all characters and graphics likely to be carried by the various articles to be sorted, having specific characteristics determined to enable it to be detected and to enable location of the address within the digitized image of each article concerned.

Figure 2:
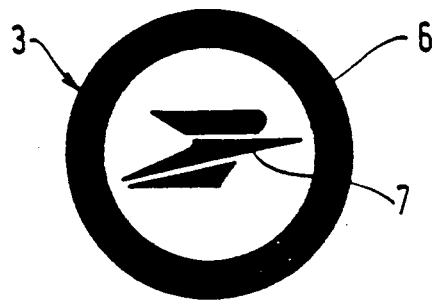
FIG. 2 shows to a larger scale the addressing mark carried by the label from FIG. 1.

FIG. 2 shows one example of this special addressing mark 3. The mark 3 comprises a ring 6 with specific inside and outside diameters, in other words a geometrical figure which is invariant with rotation, and an irregular insignia 7 within the ring. In this case the insignia shown is the logotype of the French Post Office, which meets the stated requirements, but any other totally asymmetric graphic could be used. The insignia 7 is designed to confirm or validate a ring detected within the digitized image and also to enable the orientation of the addressing mark 3 within the digitized image of the article to be determined, so that the location of the address in the addressing area can be determined.

Irrespective of the orientation of the successive articles to be scanned, the ring 6 is invariant in rotation and is represented by a first set of data in the image of the object. The insignia 7 is represented by different second sets of data associated with different possible orientations. However, there is a corresponding relationship between a selected limited number of different scanning orientations and the same limited number of predetermined second sets of data representing this insignia.

The first data set characteristic of the ring alone and the limited number of second data sets characteristic of the insignia constitute characteristics of the addressing mark 3 which are used by an address location device in accordance with the invention.

Figure 3:
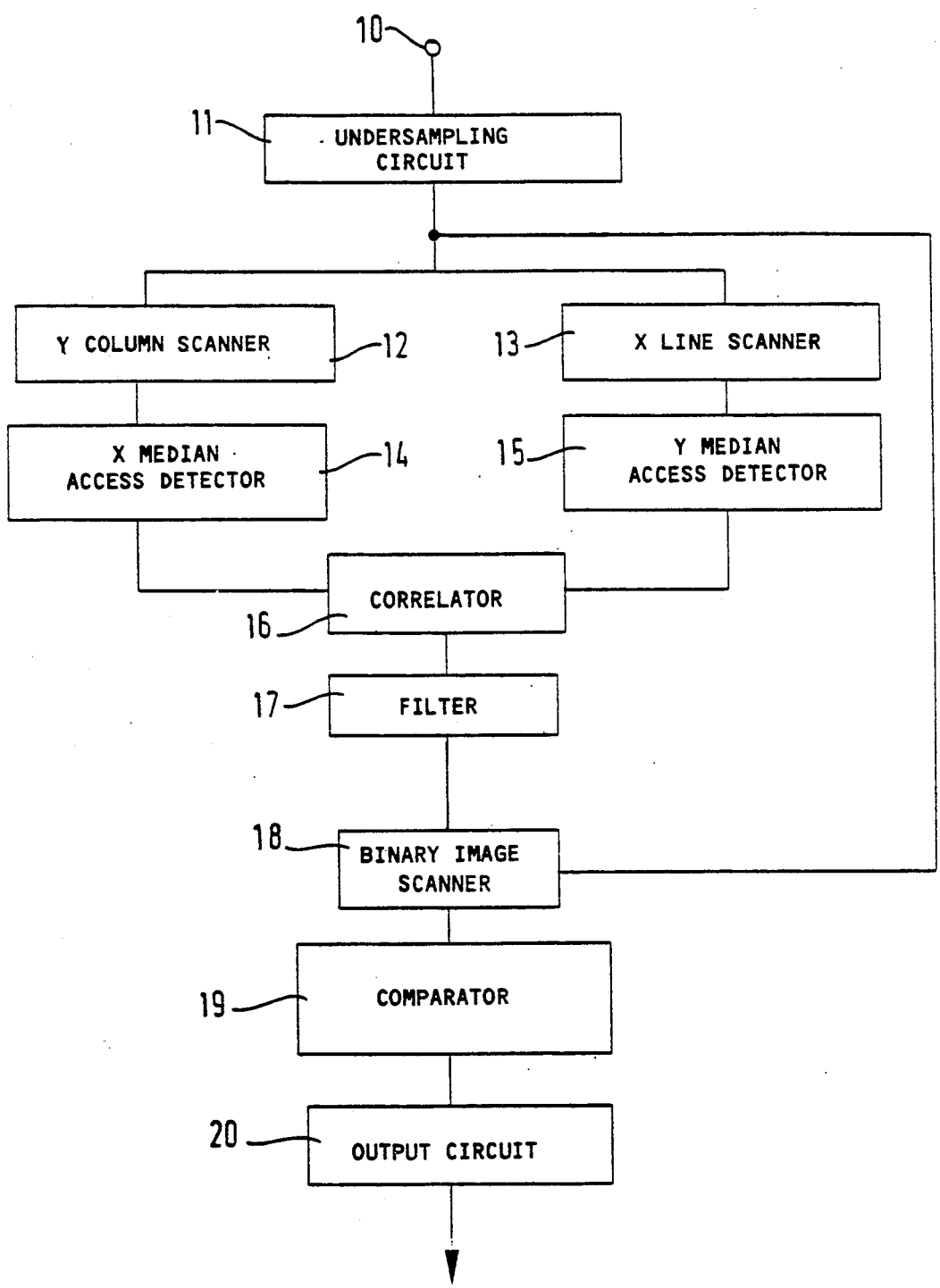
FIG. 3 is a block diagram of an address location device in accordance with the present invention.

FIG. 3 is a block diagram of one such device. The device receives binary data produced by scanning the successive articles to be sorted. These articles are presented stacked on edge, for example, in a magazine equipped with an unstacking device. The scanner, which is known in itself, scans the topmost article in the stack before or after it is extracted. The scanner may comprise a camera and a binary digitizer circuit. It outputs in serial form the successive bits representing the tone levels of areas along successive Y-axis scan columns (or X-axis scan lines). The camera is a CCD (charge-coupled device) camera capturing the image of each article extracted from the magazine and passed across it, in Y-axis columns. The background level is represented by a 0 bit, for example, and the character or information level by a 1 bit. The known resolution power of this circuit is 8 dots/mm.

The resulting digitized image is received at an input 10 of the address location device. An undersampling circuit 11 converts it into a lower resolution (4 dots/mm) image to reduce the processing time.

The device then processes the digitized image supplied by the circuit 11. It essentially comprises:

a Y column scanner 12 for scanning the Y-axis columns of the image signal and an X line scanner 13 for scanning the X-axis lines of the image signal, both connected to the undersampling circuit 11 and detecting two segments of said ring 6, respectively on the Y-axis column and on the X-axis line, on the basis of the characteristics of the ring, to show up a center point of each of the two segments on the Y and X axes, respectively, an X median axis detector 14 connected to the Y column scanner 12 and a Y median axis detector 15 connected to the X line scanner 13 determining from the center points identified by the respective scanners 12 and 13 the presence of X and Y axes possibly forming part of the ring, a correlator 16 connected to the detectors 14 and 15 detecting coincidence at one point on the aforementioned X and Y axes to determine the center of the ring, the combination at this point of the X and Y axes representing an accumulation property of the ring whose center is at the middle of the median line of any chord, a filter 17 connected to the correlator 16 combining closely spaced centers detected by the correlator 16 to confirm or validate a single center, a binary image scanner 18 for scanning the binary image in any ring defined relative to each confirmed or validated center, connected to the undersampling circuit 11 to receive the image of the article and to the filter 17 to select only the image within any ring, the scanner 18 breaking down the interior of any ring into cells for scanning, a comparator 19 connected to the scanner 18 and comparing the signal scanning the interior of each ring with a limited number of predetermined reference signals defining for various discrete orientations the signal produced by scanning the insignia 7 within the addressing mark 3, an output circuit 20 connected to the comparator 19 and detecting identity of the signal produced by scanning the interior of any ring and one of the reference signals, confirming or validating the ring if the coincidence detected is the only one in all of the image of the article, and defining its orientation, in order to locate the address which is transmitted to a downstream address recognition and sorting system, or invalidating it if the comparison shows non-identity or if there is more than one ring in the image of the same article, in order to reject the article concerned from the downstream system.

The address location device could be implemented entirely in software; it would then operate on the stored digitized image of each article.

Figure 4:
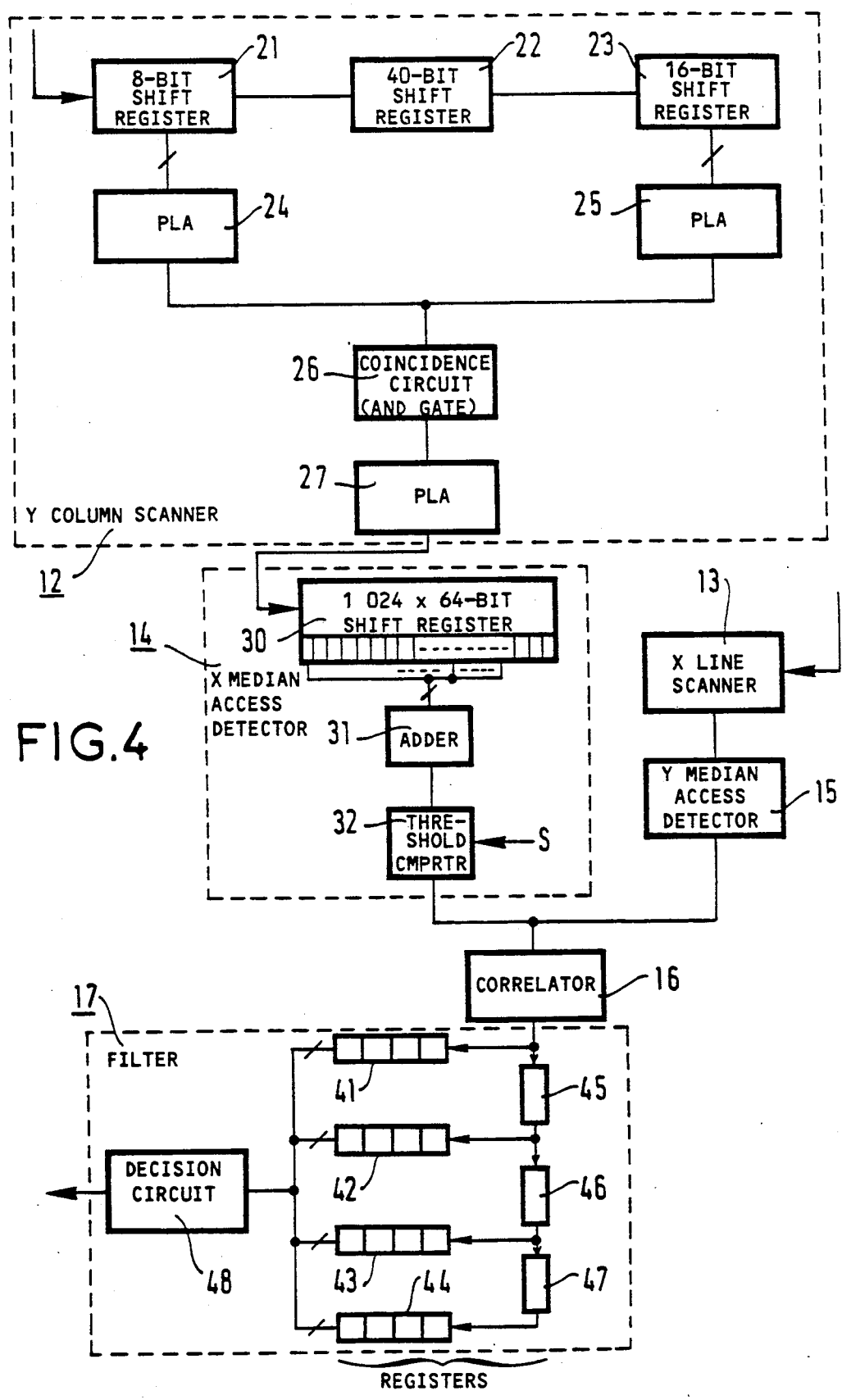
FIG. 4 shows one implementation of one part of said device.

The image location device is preferably implemented by logic circuits processing bits output from the undersampling circuit 11 in pipeline mode, that is to say without storing the image of the article. FIG. 4 shows one such embodiment. This will be described with reference to a specific numerical example in which:

the order of the bits delivered by the circuit 11 is:
0. 1 through 1 024 for the first Y scan column output,
0. 1 025 through 2 048 for the second, and so on for subsequent columns, a 0 bit represents the background level of the article and a 1 bit represents information on the article, the dimensional characteristics of the ring 6 are as follows:
outside diameter : 15 mm or 60 bits,
inside diameter : 13 mm or 52 bits,
thickness : 1 mm or 4 bits, the maximum slantwise length of a segment of the ring is 6 bits.

FIG. 4 shows only the circuits 12, 14, 16 and 17 from FIG. 3.

The Y column scanner 12 processing successive bits of the image comprises at its input three cascaded shift registers 21, 22 and 23 defining a 64-bit Y scan window. The register 21 receives the successive bits of the image in the order in which they are output by the undersampling circuit 11; its capacity is eight bits, representing the maximal length of a ring segment represented by six 1 bits with two additional 0 bits, one on either side of the segment; this register has eight parallel outputs for the eight bits that it contains. The register 22 has a capacity of 40 bits and couples the last stage of the register 21 to the input of the register 23 with a time-delay. The register 23 has a capacity of 16 bits and 16 parallel outputs.

The eight parallel outputs of the register 21 are connected to a programmed logic array (PLA) 24. The 16 parallel outputs of the register 23 are connected to the inputs of a similar PLA 25. The PLA 24 and 25 both detect between four and six consecutive 1 bits in the stream of bits that they receive. They deliver at their output a signal indicating detection or non-detection of said 1 bits.

A coincidence circuit 26 (an AND gate, for example) is connected to the PLA 24 and 25. When at logic "1" its output indicates the presence of a ring median axis resulting from these two segments.

The coincidence circuit 26 is connected to another programmed logic array 27 which invalidates any new coincidence indication from the circuit 25 within the length (64 bits) of the Y scan window defined by the registers 21, 22 and 23.

The X median axis detector 14 has at its input a shift register 30 receiving the successive states of the coincidence circuit 26. Its capacity is 1 024×64 bits, representing 64 columns of the article image signal. Its stages numbered 1, 1 025, etc define 64 parallel outputs on which are delivered the 64 states representing possible coincidence detections by the coincidence circuit 26 transmitted through the PLA 27. These 64 parallel outputs represent a 64-bit line passing through the center of the ring. An adder 31 connected to the parallel outputs of the register 30 totals the parallel output states. A threshold comparator 32 confirms or validates the existence of a ring median axis if the comparison result is above the threshold. The practical threshold S is in the order of 50% of the maximal result expected for the length of the determined median axes, to allow for some uncertainty as to the representation of the thickness of the ring in the signal produced by scanning the article.

The X line scanner 13 processing the successive bits of the image is similar to the scanner 12 shown, except for its input registers whose capacities are respectively 8×1 024, 40×1 024 and 16×1 024 bits, to operate within a 64×1 024-bit X scan window containing the representation of a 64-bit X line.

The Y median axis detector 15 is similar to the detector 14 previously described. Its input register has a capacity of only 64 bits to represent a 64-bit line on the Y axis through the center.

The correlator 16 is an AND gate with two inputs connected to the threshold comparators of the detectors 14 and 15. It detects simultaneous detection of an X median axis and a Y median axis, representing the center of a ring.

The filter 17 reduces to a single point closely spaced centers recognized by the correlator 16 and passed to the filter 17. It constitutes a window of four consecutive Y bits, belonging to four consecutive X lines. It comprises four 4-bit registers 41 through 44, representing consecutive Y bits in different X lines, and three 1 024-bit registers 45 through 47 connected between the inputs of the registers 41-42, 42-43 and 43-44, representing the offset of the X lines. The filter further comprises a decision circuit 48 based on a look-up table, suppressing adjacent centers determined by the correlator 16.

These are the only ring centers in the image obtained from the filter, and are confirmed or validated by processing the image inside each ring. This processing is performed by the binary image analyzer 18 and the comparator 19 from FIG. 3, and preferably by software.

The embodiment of the device in accordance with the invention described above has been described by way of non-limiting example only. Without departing from the scope of the invention it is possible to replace certain means of said device by other equivalent means for detecting the characteristics of the ring alone and using its properties to recognize its center and to detect the data of the insignia with reference to the various possible orientations.

There is claimed:

1. Method of locating addresses on articles to be sorted in order to enable scanning of said addresses, said method comprising:
   associating with each address an addressing mark different from all other information likely to be carried by said articles, said mark comprising a first part whose shape is invariant on rotation and a second part having an irregular shape;
   producing a digitized image of each article;
   determining within said image two cartesian coordinates of a point on said first part of said mark in order to deduce therefrom two cartesian coordinates of a point of the address to be scanned, by comparing at least part of said digitized image to a first predetermined data set characteristic of said first part of said mark;
   determining the orientation of said second part of said mark in said image, in order to deduce therefrom the orientation of said address to be scanned, by comparing at least one part of said digitized image with a second predetermined data set characteristic of said second part of said mark oriented in a plurality of different directions.

2. Method according to claim 1 wherein said addressing mark combines a ring having specific inside and outside diameters and an irregular shape insignia associated with said ring.

3. Address label adapted to carry an address and, associated with said address, an addressing mark comprising a first part whose shape is invariant on rotation and a second part whose shape is irregular, so that an address on said label on articles to be sorted can be located by a method comprising:
   producing a digitized image of each article;
   determining within said image two cartesian coordinates of a point on said first part of said mark in order to deduce therefrom two cartesian coordinates of a point of the address to be scanned, by comparing at least part of said digitized image to a first predetermined data set characteristic of said first part of said mark;
   determining the orientation of said second part of said mark in said image, in order to deduce therefrom the orientation of said address to be scanned, by comparing at least one part of said digitized image with a second predetermined data set characteristic of said second part of said mark oriented in a plurality of different directions.

4. Label according to claim 3 wherein said addressing mark is preprinted at a predetermined location on said label outside the location intended for said address.

5. Label according to claim 3 wherein said addressing mark is substantially in one corner of said label which is rectangular.

6. Device for locating addresses on articles to be sorted in order to enable scanning of said addresses, by a method comprising:
   associating with each address an addressing mark different from all other information likely to be carried by said articles, said mark comprising a first part whose shape is invariant on rotation and a second part having an irregular shape;
   producing a digitized image of each article;
   determining within said image two cartesian coordinates of a point on said first part of said mark in order to deduce therefrom two cartesian coordinates of a point of the address to be scanned, by comparing at least part of said digitized image to a first predetermined data set characteristic of said part of said mark;
   determining the orientation of said second part of said mark in said image, in order to deduce therefrom the orientation of said address to be scanned, by comparing at least one part of said digitized image with a second predetermined data set characteristic of said second part of said mark oriented in a plurality of different directions, said addressing mark combining a ring having specific inside and outside diameters and an irregular shape insignia associated with said ring, and said device comprising:
   means for detecting pairs of opposite segments of said ring in said digitized image of each article from said first data set defining said characteristics of said ring,
   means for processing pairs of detected opposite segments to determine a ring center,
   means for extracting the image from the interior of said ring corresponding to each identified center in said digitized image of said article, and
   means for comparing said image extracted from said interior of said ring with a limited number of reference images representing said second data set, confirming or validating said center and said ring and defining the orientation of said addressing mark and therefore the position of said address when a single coincidence is detected by said comparison for all of said image of said article.

7. Device according to claim 6 wherein said detector means comprise a Y column scanner and an Y line scanner processing said article image signal and conjointly defining an X-Y scan window in which said bits are processed.

8. Device according to claim 7 wherein said Y and X scanners receive directly the bits of said article image signal, which is scanned in columns, and each comprise first input shift registers constituting respective X and Y scan windows and each having first and second groups of parallel outputs adapted to deliver only those bits likely to represent two opposite ring segments.

9. Device according to claim 8 wherein said processing means comprise two programmed logic arrays respectively connected to said first and second groups of parallel outputs of said first shift registers and a coincidence circuit whose inputs are connected to the outputs of said two programmed logic arrays connected to said X and Y scanners, respectively.

10. Device according to claim 9 comprising a further programmed logic array connected to said coincidence circuit to invalidate, after each coincidence is detected, any subsequent coincidence detection in the Y or X window concerned.

11. Device according to claim 9 wherein said processing means further comprise:

a second shift register connected to each coincidence circuit and receiving indications of said detected coincidences, constituting an X line register in the case of that which is part of the processing means connected to the Y scanner and constituting a Y column register in the case of the other, said line register having parallel outputs representing X line coincidences and said column register having parallel outputs representing Y column coincidences, for a defined median axis length, an adder circuit connected to the parallel outputs of each line and column register, and a threshold comparator connected to each adder circuit to confirm or validate the median axis if the adder output is above said threshold.

12. Device according to claim 11 wherein said threshold comparators of said processing means connected to said X and Y scanners are connected to an AND gate to indicate simultaneous detection of two median axes.

13. Device according to claim 12 further comprising a filter connected to said AND gate receiving indications of successive simultaneous detections of median axes and eliminating specific adjacent center detections.

14. Device according to claim 13 wherein said filter comprises four third shift registers the capacity of each of which is a few bits representing one Y window, three fourth shift registers each connected between the inputs of two of said third registers and each having a capacity corresponding to a complete column of the signal produced by scanning said article image, and a look-up table based decision circuit connected to the paralleled outputs of said four third registers.

* * * * *